United States Patent
Karr et al.

(10) Patent No.: US 6,318,774 B1
(45) Date of Patent: Nov. 20, 2001

(54) MODULAR DEVICE TO BE INSERTED INTO A VEHICLE BUMPER

(75) Inventors: Dieter Karr, Tiefenbronn; Meike Fehse, Leonberg; Martin Noll, Muggensturm; Peter Rapps, Karlsruhe; Waldemar Ernst, Vaihingen/Enz, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/423,567

(22) PCT Filed: Mar. 17, 1998

(86) PCT No.: PCT/DE98/00790

§ 371 Date: Feb. 18, 2000

§ 102(e) Date: Feb. 18, 2000

(87) PCT Pub. No.: WO98/52067

PCT Pub. Date: Nov. 19, 1998

(30) Foreign Application Priority Data

May 9, 1997 (DE) ............................................. 197 19 519

(51) Int. Cl.⁷ ................................................. B60R 19/48
(52) U.S. Cl. ........................................... 293/117; 293/102
(58) Field of Search ..................................... 293/117, 102; 180/167, 168, 169; 342/70, 71, 72

(56) References Cited

U.S. PATENT DOCUMENTS

| 3,794,997 | 2/1974 | Nishibu et al. . |
| 6,039,367 | * 3/2000 | Muller et al. ........................ 293/117 |

FOREIGN PATENT DOCUMENTS

| 39 39 387 | 6/1991 | (DE) . |
| 195 28 474 | 2/1997 | (DE) . |
| 0 466 034 | 1/1992 | (EP) . |
| 2 287 917 | 10/1995 | (GB) . |
| 97 26155 | 7/1997 | (WO) . |

* cited by examiner

*Primary Examiner*—Joseph D. Pape
(74) *Attorney, Agent, or Firm*—Kenyon & Kenyon

(57) ABSTRACT

An arrangement having a module for installation in a bumper of a motor vehicle and having a retaining part for attaching the module to the bumper. The retaining part, in this context, is fixedly attached on the interior side of the bumper blade, so that the module can be inserted from the interior side. Provision is made in the bumper for a corresponding bore, through which the head piece of the module can be plugged in until the surface is roughly flush with the exterior surface of the bumper. As the module, an ultrasonic sensor is preferably proposed, which can be used for measuring distance in a motor vehicle. Since only the head piece of the module is visible from the outside but not its attachment parts, the resulting appearance is particularly advantageous since it is not disruptive from a design point of view.

8 Claims, 2 Drawing Sheets

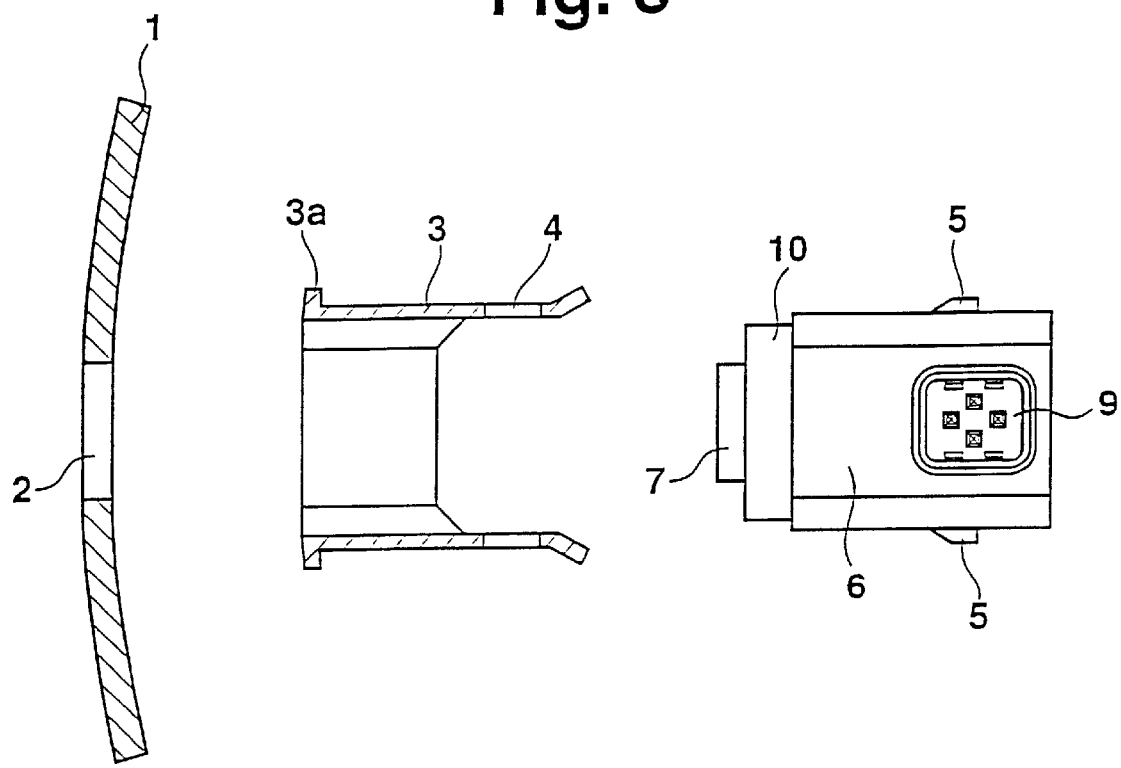
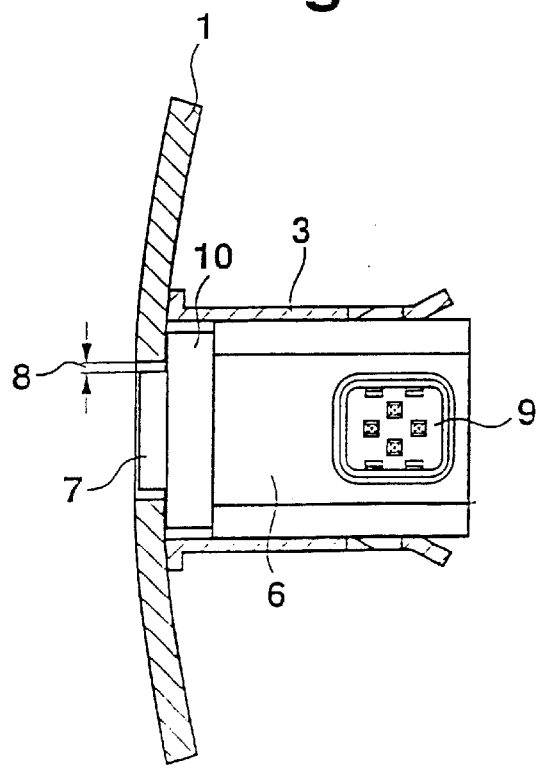

MODULAR DEVICE TO BE INSERTED INTO A VEHICLE BUMPER

BACKGROUND INFORMATION

The invention is based on an arrangement having a module for installation in a bumper of a motor vehicle according to the species of the main claim. It is already known to build modules into a bumper which are configured, for example, as ultrasonic sensors for measuring distance. In this context, the housing of the module is inserted into a corresponding bore of the bumper and is secured there. For influencing the detection range, a baffle plate is then additionally attached which partially covers the ultrasonic sensor. An arrangement of this type is known, for example, from German Patent No. 39 39 387. This arrangement, for design reasons, is not entirely desirable since the parts of the module are configured to be raised with respect to the bumper blade and as a result detract from the appearance. In addition, a sensor of this type is relatively conspicuous so that it can easily be damaged, particularly by children at play.

SUMMARY OF THE INVENTION

The contrast, the arrangement of the module according to the present invention has the advantage that the module is installed so as to be flush with the surface of the bumper and is therefore hardly noticeable. An arrangement of this type practically has no impact on the design of the motor vehicle since only a small head piece of the module is visible. The retaining part of the module is mounted behind the bumper blade and is therefore not visible from the exterior.

It is particularly advantageous to join the retaining part fixedly to the bumper using adhesives, injection-molding, or welding, so that it is fixed in place. The module is then introduced into the retaining part and is attached to the retaining part by a clip device, so that the module, on the one hand, is fixed, and, on the other hand, can be separated from the retaining part in the event of a repair.

In order that the module appear as inconspicuous as possible, its head piece is advantageously introduced into a bore of the bumper and is configured to be flush with an adjoining exterior surface of the bumper. It is advantageous if only a small gap can be seen. If the module is an ultrasonic sensor for measuring distance, then the gap advantageously functions for the acoustical decoupling from the bumper.

Furthermore, it is favorable to design the module in the color of the bumper, so that the module becomes as inconspicuous as possible.

As a result of installing the module from the rear side of the bumper, an undesirable disassembly of the module is made significantly more difficult.

BRIEF DESCRIPTION OF THE DRAWINGS

FIG. 3 shows the exemplary embodiment in an exploded view.

FIG. 4 shows the final state after the installation of the arrangement.

DETAILED DESCRIPTION

Figure 1:
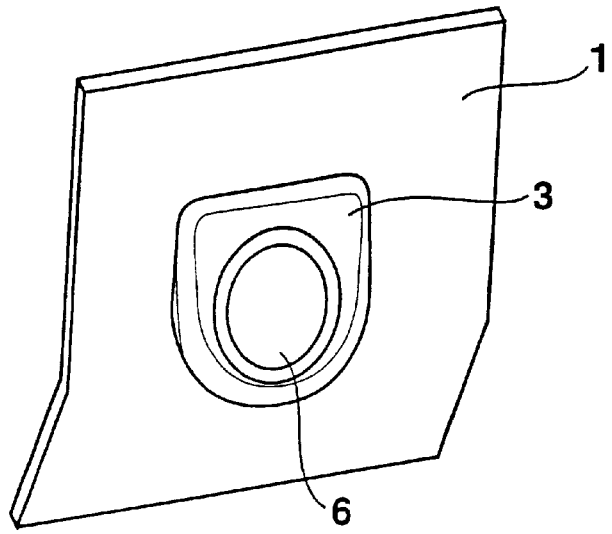
FIG. 1 shows a known embodiment of an ultrasonic sensor in a bumper.

FIG. 1 shows a known arrangement of a module 6, which is configured as an ultrasonic sensor and is installed in a bumper 1. For securing module 6, a retaining part is introduced from the outside through an opening in bumper 1 that is not visible from the outside, the opening at the same time accommodating module 6. In this arrangement, both module 6 and retaining part 3 are visible. An arrangement of this type is felt to be intrusive for design reasons and is therefore as a rule undesirable.

Figure 2:
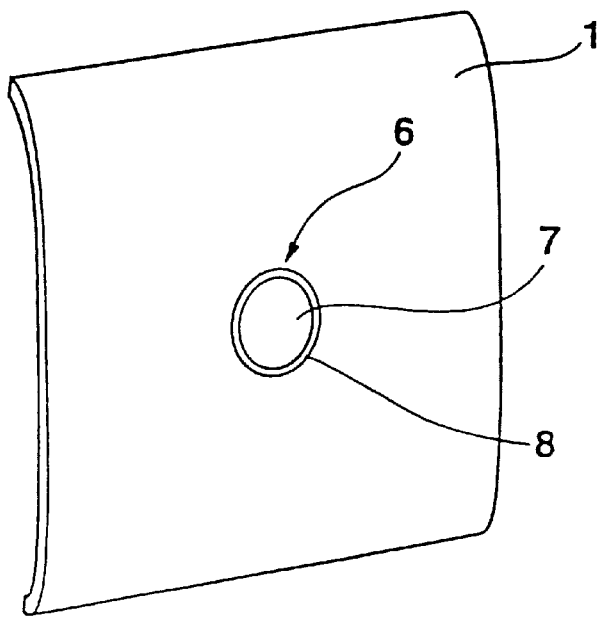
FIG. 2 shows an exemplary embodiment of the present invention.

FIG. 2 shows the arrangement of an exemplary embodiment according to the present invention, in which module 6 is introduced into bumper 1 from the rear, so that only head piece 7 is visible from the outside. In particular, if module 6 or only head piece 7 has been painted or configured in the color of bumper 1, this arrangement appears very unnoticeable and inconspicuous, even if a gap 8 is visible.

FIG. 3 in an exploded view depicts the arrangement of the exemplary embodiment according to the present invention having module 6 installed in bumper 1 of an undepicted motor vehicle.

Retaining part 3 is configured so as to be tube-shaped and has an end face that is configured as collar 3a. Retaining part 3, at this end face 3a, is attached to a suitable bore 2 in bumper blade 1 from the rear side of bumper 1. For purposes of attachment, conventional joining technologies can be used such as adhesives, welding, injection-molding, or bolts. After retaining part 3 is attached to bumper 1, module 6 is inserted from the rear into retaining part 3 until head piece 7 in its end face rests roughly flush with the adjoining exterior surface of bumper 1. Head piece 7 in its diameter is dimensioned to be somewhat smaller so that it fits into bore 2 of bumper 1. In configuring module 6 as an ultrasonic sensor, it is preferable if the diameter of bore 2 is dimensioned such that a small gap 8 remains between head piece 7 and the wall of bumper 1, so that an acoustical decoupling between the vibrating membrane (head piece 7) and bumper 1 is achieved. Module 6 is preferably fixed in retaining part 3 by an elastic retaining ring 10, which is introduced in the area of head piece 7, the module being preferably secured against an axial dislocation using a clip device 4,5. Clip device 4 is configured on the retaining part 3 so as to be elastic, so that, when clip device 4,5 is disengaged, module 6 is released and can be removed. Via a connecting part 9, module 6 can be connected electrically to a control device.

FIG. 4 shows the arrangement according to the present invention after installation on bumper 1. The module is preferably configured so as to be rotationally symmetrical, so that it can also be secured to bumper 1 when rotated 180°. The head piece is arranged so as to be roughly flush with the external side of bumper 1, so that head piece 7 at first glance is not recognizable, especially if it is painted the color of bumper 1.

What is claimed is:

1. An arrangement comprising:

a motor vehicle bumper having an interior side;

a retaining part, the retainer part being on the interior side of the bumper; and a module for installation in the bumper, the module having a head piece, the module being insertable into the retaining part from the interior side of the bumper, the retaining part attaching the module to the bumper, the retaining part attaching the module such that the head piece of the module, after installation, is situated substantially flush with an adjoining exterior surface of the bumper.

2. The arrangement according to claim 1, wherein the retaining part is fixedly joined to the bumper.

3. The arrangement according to claim 2, wherein the retaining part is fixedly joined to the bumper using at least one of an adhesive, injection-molding, welding, and bolts.

4. The arrangement according to claim 1, wherein the retaining part includes a clip device for detachably mounting the module.

5. The arrangement according to claim 1, wherein the head piece of the module is inserted into a bore of the bumper.

6. The arrangement according to claim 5, wherein the bore, in relation to the head piece, forms a gap having a prescribed width.

7. The arrangement according to claim 1, wherein the module includes an ultrasonic distance-measuring sensor.

8. The arrangement according to claim 1, wherein the module has, at least partly, a same color as the bumper.

* * * * *